United States Patent [19]
Honjo et al.

[11] Patent Number: 5,422,971
[45] Date of Patent: Jun. 6, 1995

[54] OPTICAL FIBER CONNECTOR USING ADHESIVE

[75] Inventors: Makoto Honjo; Hiroshi Katsura; Tomohiko Ueda; Toru Yamanishi, all of Kanagawa, Japan

[73] Assignee: Sumitomo Electric Industries, Ltd., Osaka, Japan

[21] Appl. No.: 190,351

[22] Filed: Feb. 1, 1994

[30] Foreign Application Priority Data

| Feb. 2, 1993 | [JP] | Japan | 5-036187 |
| Feb. 26, 1993 | [JP] | Japan | 5-063212 |
| Mar. 22, 1993 | [JP] | Japan | 5-087929 |

[51] Int. Cl.$^6$ .............................. G02B 6/26
[52] U.S. Cl. ........................ 385/80; 385/77; 385/78; 385/82; 385/139
[58] Field of Search ............... 385/14, 51, 60, 65, 385/71, 72, 76, 77, 78, 80, 82, 64, 83, 139; 427/162, 163; 156/158, 160, 330

[56] References Cited

U.S. PATENT DOCUMENTS

| 3,871,935 | 3/1975 | Gloge et al. | 385/80 X |
| 4,591,627 | 5/1986 | Maruno et al. | 156/330 X |
| 4,637,939 | 1/1987 | Maruno et al. | 156/330 X |
| 4,729,624 | 3/1988 | Kakii et al. | 385/80 X |
| 4,818,059 | 4/1989 | Kakii et al. | 385/80 X |
| 4,830,456 | 5/1989 | Kakii et al. | 385/80 X |
| 4,950,048 | 8/1990 | Kakii et al. | 385/80 X |
| 5,216,733 | 6/1993 | Nagase et al. | 385/78 X |
| 5,241,613 | 8/1993 | Li et al. | 385/78 |
| 5,321,785 | 6/1994 | Iida et al. | 385/85 |
| 5,341,447 | 8/1994 | Edwards et al. | 385/81 |

FOREIGN PATENT DOCUMENTS

| 3608018 | 9/1987 | Germany | 385/80 X |
| 4230168 | 8/1993 | Germany | 385/80 X |

OTHER PUBLICATIONS

Patent Abstracts of Japan, vol. 14, No. 245 (P-1052) May 24, 1990 & JP-A-02 064 508 (Fujitsu) Mar. 5, 1990.
Murata et al, "UV-Curable Adhesives for Optical Communications", Journal of Adhesion, vol. 35, No. 4, 1991, New York, US, pp. 251-267.
Nakamura et al, "Design and Development of Optical Adhesives for Optical Communications", Review of Electrical Communications Laboratories, vol. 37, No. 2, 1989, Tokyo, Japan, pp. 127-132.

*Primary Examiner*—Brian Healy
*Attorney, Agent, or Firm*—Cushman Darby & Cushman

[57] ABSTRACT

The present invention relates to an adhesive for connecting and fixing an optical fiber to an optical connector and to an optical connector which uses that adhesive. The adhesive prevents deformation of the optical connector ferrule and stressing of the optical fiber due to hardening shrinkage during the hardening of the adhesive and/or a shrinkage during cooling of the adhesive. In accordance with the invention, (1) the value of (the coefficient of linear expansion (°C.$^{-1}$) of the adhesive)×(the difference between a hardening temperature of the adhesive and room temperature (°C.))×(Young's Modulus (kg/mm$^2$) of the adhesive) is equal to or less than about 2.5, (2) the value of (the rate of hardening shrinkage (%) of the adhesive)×(Young's Modulus (kg/mm$^2$) of the adhesive) is equal to or less than about 1000 and/or (3) the adhesive hardens at room temperature.

18 Claims, 1 Drawing Sheet

OPTICAL FIBER CONNECTOR USING ADHESIVE

BACKGROUND OF THE INVENTION

1. Field of the Invention

This invention relates to an adhesive for adhering and fixing an optical fiber to the optical connector in an optical system, and to an optical connector connected and fixed to the optical fiber by the adhesive.

2. Description of the Related Art

The general shape of an optical connector ferrule, especially a multi-fiber optical connector ferrule, is shown in FIG. 1. For example, after an optical fiber cable including four optical fibers is inserted into an optical fiber cable insert hole 5 and each of the fibers in inserted into an optical fiber insert hole 4, a thermosetting epoxy type adhesive 8 is injected into an adhesive injection opening 2. Generally, one optical fiber cable includes up to 1000 optical fibers. The adhesive 8 is hardened at about 80° C. so that the optical fiber is fixed to the ferrule 1. Thereafter, the end portion of the ferrule is ground to form an optical connector. As shown, a plurality of fixing pin insert holes 3 are provided-for receiving fixing pins to connect to another optical connector. FIG. 2 is a cross sectional view taken along line II—II of FIG. 1 and wherein the adhesive 8 has been injected into the adhesive injection opening 2. The adhesive needs to have a low viscosity to fill up to the end of the optical fiber holes 4 and a high hardness to fix the optical fiber tightly when the ferrule 1 is ground.

In addition, conventionally, the thermosetting epoxy type adhesive used is selected to provide resistance to chemicals or the like. ("Optoronics" No. 3, pages 103 to 106, published in 1991)

Specifically, in the conventional adhesive, the coefficient of linear expansion is from $5.0 \times 10^{-5}$ to $1.0 \times 10^{-4}$, Young's Modulus is from 500 to 1000 kg/mm$^2$, the hardening temperature is from 60° C. to 100° C., the filler content is from 0 weight % to 30 weight %, the viscosity at the hardening temperature is 100 cps to 1000 cps, the particle diameter of the filler is from 0.1 μm to 100 μm, and the rate of hardening shrinkage is 1% to 5%.

However, the conventional adhesive has had the problem(s) that the ferrule may be deformed and that the optical fiber is stressed, thereby increasing light transmission loss, by the shrinkage force of the adhesive during cooling down from the hardening temperature to room temperature, or a shrinkage after hardening.

SUMMARY OF THE INVENTION

As a result of an examination of the above problems, it was recognized, in accordance with the present invention that the coefficient of linear expansion and the Young's, Modulus of the adhesive have to be small to prevent deformation of the ferrule and to minimize stress to the optical fiber.

In addition, the rate of hardening shrinkage and Young's Modulus of the adhesive have to be small to prevent deformation of the ferrule and to minimize stress to the optical fiber.

Further, the adhesive has to harden at room temperature to prevent deformation of the ferrule. Adhesives that harden at room temperature are a silicone type RTV rubber adhesive, UV hardening type adhesive, visible light hardening type adhesive and the like.

Thus, the objects of the present invention are to provide:

1. an adhesive for connecting and fixing an optical fiber to an optical connector ferrule, wherein the value of (the coefficient of linear expansion of the adhesive (°C.$^{-1}$))×(the difference between the hardening temperature of the adhesive and room temperature (°C.))×(Young's Modulus (kg/mm$^2$)) is 2.5 or less;
2. an adhesive for connecting and fixing an optical fiber to an optical connector ferrule, wherein the value of (the rate of hardening shrinkage (%))×(Young's Modulus (kg/mm$^2$)) is 1000 or less;
3. an adhesive for connecting and fixing an optical fiber to an optical connector ferrule, wherein the adhesive adheres the optical fiber and the optical connector ferrule at room temperature; and, further,
4. an optical connector which uses any one of the above three adhesives.

Other objects, features and characteristics of the present invention, as well as the functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
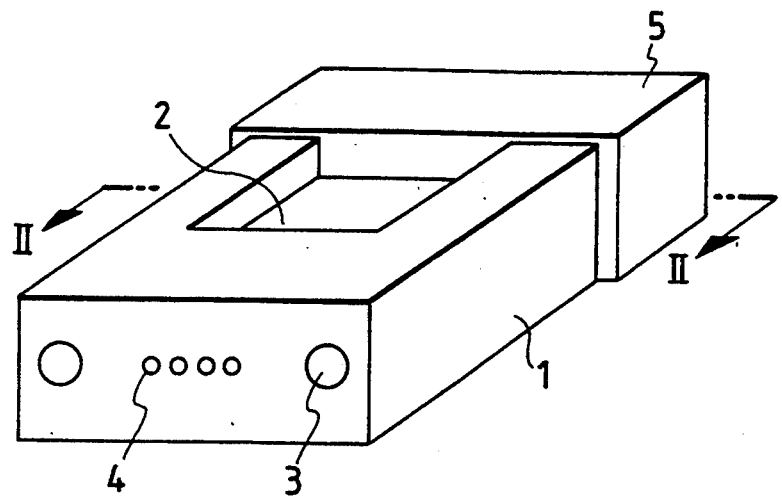
FIG. 1 is a perspective view showing an optical connector ferrule.
Figure 2:
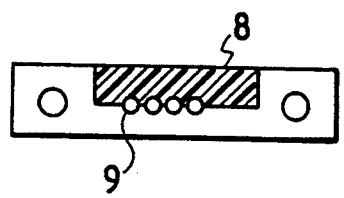
FIG. 2 is a cross sectional view taken along line II—II of FIG. 1.

The present invention will be described in detail as follows:

In a first adhesive for an optical connector in accordance with the present invention, the value of (the coefficient of linear expansion of the adhesive (°C.$^{-1}$))×(the difference between the hardening temperature of the adhesive and room temperature (°C.))×(Young's Modulus (kg/mm$^2$)) is 2.5 or less. Although a filler is effective to provide an adhesive that has a small coefficient of linear expansion, the filler contributes to an increase in the viscosity of the adhesive.

Accordingly, the filler content in the adhesive, in accordance with the invention, is preferably from about 20 weight % to 70 weight % and the viscosity thereof is preferably from about 50 cps to 2000 cps at a temperature when the optical fiber is adhered to the ferrule. In addition, it is preferable to use a filler having a small diameter which is from about 0.1 μm to 1.0 μm so that the adhesive will have a low viscosity, even if it includes the filler.

Since the first adhesive of the present invention has a small coefficient of linear expansion and Young's Modulus, it is unlikely that the ferrule will be deformed by a shrinkage force during cooling down or that there will be an increase in the light transmission loss from stress to the optical fiber.

Preferably, as noted above, in the first adhesive of the present invention, the value of (the coefficient of linear expansion of the adhesive (°C.$^{-1}$))×(the difference between the hardening temperature of the adhesive and the room temperature (°C.))×(Young's Modulus (kg/mm$^2$)) is 2.5 or less. The coefficient of linear expansion of the adhesive is preferably near that of the ferrule material ($1\times10^{-5}$–$2\times10^{-5}$), and most preferably less than $4.0\times10^{-5}$.

The filler causes the adhesive to have a small coefficient of linear expansion. As noted above, the filler content is preferably from about 20 weight % to 70 weight %. A content of less than about 20 weight % does not contribute to a decrease the coefficient of linear expansion. A content of more than about 70 weight % makes the adhesive too viscous.

As noted above, the filler increases the viscosity of the adhesive. Therefore, a spherical filler, the diameter of which is from 0.1 μm to 1.0 μm, is preferably used so that the adhesive will have a good fluidity and will flow to the end of an optical fiber insert holes. A diameter of more than 1.0 μm does not contribute to fluidity. A diameter of less than 0.1 μm coheres easily. Preferably, the filler included in the first adhesive of the present invention is silica, calcium carbonate, alumina, mica or the like. The viscosity of the first adhesive of the present invention is preferably from 50 cps to 2000 cps at the hardening temperature. A viscosity of less than 50 cps is too fluid and is thus difficult to work with. A viscosity of more than 2000 cps does not flow to the end of the optical fiber hole(s).

The Young's Modulus of the first adhesive is preferably from 100 kg/mm$^2$ to 1000 kg/mm$^2$. An adhesive having a Young's Modulus of more than 1000 kg/mm$^2$ stresses the material of the ferrule and causes the optical fiber to deform, thereby increasing the light transmission loss. Further, an adhesive having a Young's Modulus of less than 100 kg/mm$^2$ is too soft to support the optical fiber when the optical connector is ground.

By way of example, epoxy type, silicone type, acrylic type and urethane type or like adhesives are preferable as the first adhesive of the present invention.

In order to produce the first adhesive for the optical connector of the present invention, inorganic filler, thickener, thixotropy agent, some kinds of fixing agent and the like may be added to an epoxy resin having a predetermined viscosity, for example, EPOTECH, produced by Epoxy Technology Co. Ltd., so that the adhesive has a predetermined coefficient of linear expansion, viscosity and Young's modulus.

In the second adhesive of present invention, the value of (the harding shrinkage (%)))×(Young's Modulus (kg/mm$^2$) is 1000 or less and, especially, the rate of hardening shrinkage is preferably 1% or less and the Young's Modulus is preferably from 100 kg/mm$^2$ to 1000 kg/mm$^2$. Since the second adhesive of the present invention has a small rate of hardening shrinkage and Young's modulus, it is unlikely that it will deform the ferrule during hardening of the adhesive and or that the adhesive will increase the light transmission loss by stressing the optical fiber. If the Young's modulus of the second adhesive of the present invention is more than 100 kg/mm$^2$, the ferrule material and the optical fiber are stressed to deform and thus there is an increase in the light transmission loss. Furthermore, if the Young's Modulus of the second adhesive is less than 100 kg/mm$^2$, it too soft and cannot support the optical fiber sufficiently when the optical fiber is ground.

The presence of filler in the adhesive causes the adhesive to have a low rate of hardening shrinkage. The filler content is preferably from about 20 weight % to 70 weight %. However, generally, the filler increases the viscosity of the adhesive. Accordingly, the adhesive preferably includes a spherical filler the diameter of which is from 0.1 μm to 1.0 μm so as to have a good fluidity and to flow to the end of the optical fiber insert holes. A diameter of more than 1.0 μm does not contribute to fluidity. A diameter of less than 0.1 μm coheres too easily. Furthermore, if the filler content is less than about 20 weight %, it is not possible to decrease the hardening shrinkage and the coefficient of linear expansion. If the content is more than about 70 weight %, the adhesive is too viscous.

Silica, calcium carbonate, alumina, mica or the like are preferable for the filler of the second adhesive of the present invention.

The viscosity of second adhesive is preferably from 50 cps to 2000 cps at the hardening temperature. If the viscosity is less than 50 cps, the adhesive is too fluid and is thus hard to work with.

Preferably, the second adhesive of the present invention is an epoxy type adhesive, silicone type adhesive, acryle type adhesive or the like.

The third adhesive, in accordance with the present invention, hardens at room temperature, so that the adhesive does not shrink from temperature changes after hardening. Thus, it is unlikely that the ferrule will deform or that the optical fiber will be stressed so as to increase light transmission loss. Adhesives that harden at room temperature are silicone type RTV rubber adhesive, UV hardening type adhesive, visible light hardening type adhesive and the like.

The silicone type RTV rubber adhesive reacts with water in the air, which is classified as a deacetic acid type, a deoxim type, a dealcohl type, a deacetone type or the like. Although, generally, epoxy type adhesives are thermosetting, an alipaticamine type hardening agent can make it harden at room temperature. Further, an adhesive which is hardened by UV light or visible light is an urethane acrylate, epoxy acrylate, silicon acrylate, cyano acrylate or the like.

The preferred viscosity of the third adhesive is from about 50 cps to 2000 cps. If the viscosity is less than 50 cps, it will be too fluid and hence will be difficult to work with. If the viscosity is more than 2000 cps, it will be too viscous for the optical fiber insert holes to be filled sufficient with the adhesive.

The preferred Young's Modulus of the third adhesive is 1000 kg/mm$^2$. A Young's Modulus of less than 100 kg/mm$^2$ will be too soft to support and fix the optical fiber during grinding.

EXAMPLES

FIRST EMBODIMENT

Figure 3:
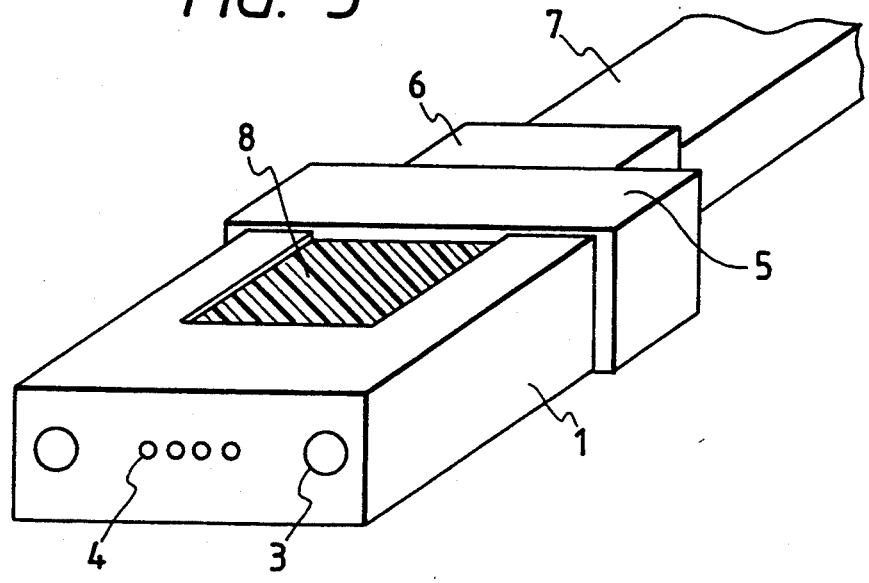
FIG. 3. is a perspective view showing an optical connector produced using an adhesive in accordance with the present invention.

A tape-like coated optical fiber 7, in which four single mode fibers were disposed in parallel, was inserted in the optical connector ferrule 1 molded by transfer molding, as shown in FIG. 1. A boot 6 supports the tape-like coated optical fiber. An epoxy adhesive 8 (two-liquid type thermosetting epoxy adhesive including an aromatic amine hardening agent) comprising from 20 weight % to 70 weight % of a filler which includes silica, the diameter of which was 0.1 μm to 1.0

μm, was injected form the adhesive injection opening 2 and hardened at 80° C. for 1 hour, whereby the optical connector as shown in FIG. 3 was produced.

Eight kinds of adhesive, as indicated in Table I, were used in order to measure the deformation volume of the adhesive and the light transmission loss thereof at a wavelength of 1.3 μm after the adhesive hardened. The results of the measurements are indicated in Table I.

The adhesive having a viscosity of less than 50 cps was too fluid to be able to fix the optical fiber sufficiently. Further, the adhesive having a viscosity of more than 2000 cps could not flow to fill to the end of the optical fiber insert hole(s). When the adhesive having a filler with a diameter of from 0.1 μm to 1.0 μm (so that the coefficient of linear expansion thereof was less than $4.0 \times 10^{-5}$ and the viscosity thereof was less than 2000 cps) was used, an optical connector ferrule which has a small deformation volume and little transmission loss after hardening can be produced.

SECOND EMBODIMENT

A four-fiber optical connector ferrule, as shown in FIG. 1, was molded by transfer molding. A tape-like coated optical fiber, in which four optical fibers were disposed in parallel, was inserted into the ferrule, and each of the eight kinds of epoxy type adhesive indicated in Table II, including a filler comprising a silica, was injected from an adhesive injection opening 2. Thereafter, it was hardened at 80° C. for 1 hour so as to adhere and fix an optical fiber. Then, the deformation volume at a wavelength of 1.3 μm was measured. The results of the measurements are indicated in Table II.

The adhesive having a viscosity of less than 50 cps was so fluid that it was difficult to fix the optical fiber. The adhesive having a viscosity of more than 2000 cps did not flow to the end of the optical fiber insert hole(s). Furthermore, a filler, the diameter of which was from 0.1 μm to 1.0 μm, was used so that the hardening shrinkage was less than 0.1 μm and the viscosity was less than 2000 cps.

THIRD EMBODIMENT

EMBODIMENT 3-1

A four-fiber optical connector ferrule, as shown in FIG. 1, was molded by transfer molding. A tape-like coated optical fiber, in which four optical fibers were disposed in parallel, was inserted into the ferrule and a silicone type RTV rubber adhesive (viscosity: 1000 cps; Young's Modulus: 100 kg/mm$^2$) was injected from an adhesive injection opening 2. Thereafter, it was hardened at 25° C. over 8 hours so as to produce an optical connector shown in FIG. 3.

The deformation volume of the adhesive before and after hardening measured by a surface roughness tester was less than 0.1 μm. Furthermore, the light transmission loss measured at a wavelength of 1.3 μm was less than 0.1 dB.

EMBODIMENT 3-2

A four-fiber optical connector ferrule, as shown in FIG. 1, was molded by transfer molding as in Embodiment 3-1. A tape-like coated optical fiber, in which four optical fibers were disposed in parallel, was inserted into the ferrule, and a UV hardening type adhesive was injected from an adhesive injection opening 2. It was hardened by UV light without raising the temperature so as to produce an optical connector as shown in FIG. 3. The deformation volume thereof was less than 0.1 μm and the light transmission loss thereof was less than 0.2 dB.

EMBODIMENT 3-3

A four-fiber optical connector ferrule, as shown in FIG. 1, was molded by transfer molding, as in Embodiment 3-1. A tape-like coated optical fiber, in which four optical fibers were disposed in parallel, was inserted into the ferrule, and an epoxy type adhesive, the hardening agent of which was of the alopaticamine type, was mixed and injected from an adhesive injection opening. Thereafter it hardened at 25° C. for 8 hours so as to form an optical connector as shown in FIG. 3. The deformation volume thereof was less than 0.1 μm and the light transmission loss thereof was less than 0.1 dB.

Comparative Example 1

A four-fiber optical connector ferrule as shown in FIG. 1 was molded by transfer molding, as in Embodiment 3-1. A tape-like coated optical fiber, in which four optical fibers were disposed in parallel, was inserted into the ferrule, and an epoxy type adhesive, including an alopaticamine type hardening agent, was mixed and injected from an adhesive injection opening 2. Thereafter it was hardened at 80° C. for 2 hours and cooled down to room temperature so as to form an optical connector as shown in FIG. 3. The deformation volume thereof was less than 0.5 μm and the light transmission loss thereof was less than 0.3 dB.

As described above, in the first adhesive for the optical connector of the present invention, since the value of (the coefficient of linear expansion of the adhesive (°C.$^{-1}$))×(the difference between the hardening temperature of the adhesive and the room temperature (°C.))×(Young's Modulus of the adhesive (kg/mm$^2$)) is as small as 2.5 or less, the deformation volume of the ferrule after hardening and the stress given to the optical fiber is small.

Further, in the present invention, the viscosity of the first adhesive during hardening is from 50 cps to 2000 cps so that the adhesive flows to the end of the optical fiber insert holes of the optical connector sufficiently and there are no optical fiber breakage problems during grinding because the adhesive has sufficient hardness.

Next, as described above, according to the second adhesive of the present invention, since the value of (the rate of the hardening shrinkage (%))×(Young's Modulus (kg/mm$^2$)) is 1000 or less, the deformation volume of the ferrule during hardening is small and little stress is given to the optical fiber, so as to prevent light transmission loss.

In addition, since the filler of the second adhesive has a small diameter and the viscosity thereof is from 50 cps to 2000 cps, the adhesive flows sufficiently to the end of the optical fiber insert holes and has sufficient hardness so that the optical fiber is not broken during grinding.

Furthermore, since the third adhesive for the optical connector of the present invention is hardened at room temperature, there is not ferrule deforming shrinkage as a result of a temperature change after hardening, and the optical fiber is not stressed in a manner that would notably increase the transmission loss.

Additionally, the viscosity of the third adhesive is from 50 cps to 2000 cps so as to permit injection of the adhesive sufficiently to the end of the optical fiber insert holes. Since the Young's Modulus of the third adhesive is 100 or more (kg/mm$^2$), the optical fiber is not broken during grinding.

It has thus been demonstrated that the objects of this invention have been fully and effectively accomplished. It will be realized, however, that the foregoing preferred embodiments have been shown and described for the purposes of illustrating the structural and functional principles of the present invention and are subject to change without departure from such principles. Therefore, this invention includes all modifications encompassed within the spirit of the following claims.

TABLE I

| Adhesive No. | 1 | 2 | 3 | 4 | 5 | 6 | 7 | 8 |
|---|---|---|---|---|---|---|---|---|
| Silica Content (wt %) | 40 | 30 | 20 | 40 | 40 | 30 | 20 | 30 |
| Grain diameter of silica ($\mu$m) | 0.1–1.0 | 0.1–1.0 | 0.1–1.0 | 0.1–1.0 | 0.1–1.0 | 0.1–1.0 | 0.1–1.0 | 0.1–1.0 |
| Viscosity [cps] | 1000 | 500 | 100 | 1000 | 1000 | 500 | 100 | 500 |
| Coefficient of linear expansion ($\times 10^{-5}$(°C.)) | 3.0 | 4.0 | 5.0 | 3.0 | 3.0 | 4.0 | 5.0 | 4.0 |
| Young's Modulus (kg/mm$^2$) | 500 | 500 | 500 | 1000 | 1200 | 1000 | 1000 | 1200 |
| Coefficient of linear expansion) × (difference between the hardening temp. and the room temp.) × (Young's Modulus | 0.9 | 1.1 | 1.4 | 1.7 | 2.1 | 2.3 | 2.9 | 2.7 |
| Deformation volume after hardening [$\mu$m] | <0.1 | <0.1 | 0.2 | 0.2 | 0.2 | 0.2 | 0.5 | 0.5 |
| Transmission loss increase after hardening (dB) | <0.1 | <0.1 | 0.1 | 0.1 | 0.1 | 0.1 | 0.3 | 0.3 |

TABLE II

| Adhesive No. | 1 | 2 | 3 | 4 | 5 | 6 | 7 | 8 |
|---|---|---|---|---|---|---|---|---|
| Rate of hardening shrinkage (%) | 0.5 | 1.0 | 1.5 | 0.5 | 0.5 | 1.0 | 1.2 | 1.0 |
| Young's Modulus | 500 | 500 | 500 | 1000 | 1200 | 1000 | 1000 | 1200 |
| (Rate of hardening shrinkage (%)) × Young's Modulus (kg/mm$^2$)) | 250 | 500 | 750 | 500 | 600 | 1000 | 1200 | 1200 |
| Deformation volume after hardening ($\mu$m) | <0.1 | <0.1 | 0.2 | 0.2 | 0.2 | 0.2 | 1.0 | 1.0 |
| Transmission loss increase after hardening (dB) | <0.1 | <0.1 | 0.1 | 0.1 | 0.1 | 0.1 | 0.3 | 0.3 |

What is claimed is:

1. An adhesive for connecting and fixing an optical fiber to an optical connector ferrule, wherein the value of (coefficient of linear expansion (°C.$^{-1}$))×(difference between a hardening temperature and room temperature (°C.))×(Young's Modulus (kg/mm$^2$)) is equal or less than about 2.5.

2. An adhesive for connecting and fixing an optical fiber to an optical connector ferrule as defined in claim 1, wherein the coefficient of linear expansion of the adhesive is equal to or less than about $4.0 \times 10^{-5}$.

3. An adhesive for connecting and fixing an optical fiber to an optical connector ferrule as defined in claim 1 wherein the Young's Modulus of the adhesive is from about 100 kg/mm$^2$ to about 1000 kg/mm$^2$.

4. An adhesive for connecting and fixing an optical fiber to an optical connector ferrule as defined in claim 1, wherein the adhesive includes from about 20 weight % to about 70 weight % filler.

5. An adhesive for connecting and fixing an optical fiber to an optical connector ferrule as defined in claim 1, wherein a viscosity of the adhesive at the hardening temperature is from about 50 cps to about 2000 cps.

6. An adhesive for connecting and fixing an optical fiber to an optical connector ferrule as defined in claim 4, wherein a grain diameter of the filler is from about 0.1 $\mu$m to about 1.0 $\mu$m.

7. An adhesive for connecting and fixing an optical fiber to an optical connector ferrule, wherein the value of (rate of hardening shrinkage (%))×(Young's Modulus (kg/mm$^2$)) is equal to or less than about 1000.

8. An adhesive for connecting and fixing an optical fiber to an optical connector ferrule as defined in claim 7, wherein the rate of hardening shrinkage is equal to or less than about 1%.

9. An adhesive for connecting and fixing an optical fiber to an optical connector ferrule as defined in claim 7, wherein the Young's Modulus is from about 100 kg/mm$^2$ to about 1000 kg/mm$^2$.

10. An adhesive for connecting and fixing an optical fiber to an optical connector ferrule as defined in claim 7, wherein the adhesive includes from about 20 weight % to about 70 weight % filler.

11. An adhesive for connecting and fixing an optical fiber to an optical connector ferrule as defined in claim 7, wherein a viscosity of the adhesive at a hardening temperature is from about 50 cps to about 2000 cps.

12. An adhesive for connecting and fixing an optical fiber to an optical connector ferrule as defined in claim 10, wherein a grain diameter of the filler is from about 0.1 μm to about 1.0 μm.

13. An adhesive for connecting and fixing an optical fiber to an optical connector ferrule as defined in claim 7, wherein said adhesive hardens at a room temperature.

14. An adhesive for connecting and fixing an optical fiber to an optical connector ferrule, wherein a rate of hardening shrinkage is equal to or less than about 1%, and said adhesive hardens at room temperature.

15. An adhesive for connecting and fixing an optical fiber to an optical connector ferrule as defined in claim 13, wherein a viscosity of the adhesive at a hardening temperature is from about 50 cps to about 2000 cps.

16. An optical connector including:
an optical connector ferrule;
an optical fiber cable insert opening for receiving an optical fiber cable in which a plurality of optical fibers are integrated;
a plurality of optical fiber insert holes for receiving each of said plurality of optical fibers;
a plurality of fixing pin insert holes for receiving fixing pins to connect to another optical connector; and
an adhesive injection opening for injecting an adhesive to adhere said optical connector ferrule and said optical fibers;
wherein said optical fiber and said optical connector ferrule are adhered by an adhesive in which the value of (coefficient of linear expansion ($°C.^{-1}$) of said adhesive)×(difference between a hardening temperature of the adhesive and room temperature (°C.))×(Young's Modulus (kg/mm$^2$) of the adhesive) is equal to or less than about 2.5.

17. An optical connector including:
an optical connector ferrule;
an optical fiber cable insert opening for receiving an optical fiber cable in which a plurality of optical fibers are integrated;
a plurality of optical fiber insert holes for receiving each of said plurality of optical fibers;
a plurality of fixing pin insert holes for receiving fixing pins to connect to another optical connector; and
an adhesive injection opening for injecting an adhesive to adhere said optical connector ferrule and said optical fibers;
wherein said optical fiber and said optical connector ferrule are adhered by an adhesive in which the value of (rate of hardening shrinkage (%) of the adhesive)×Young's Modulus (kg/mm$^2$) of the adhesive) is equal to or less than about 1000.

18. An optical connector according to claim 17, wherein said adhesive hardens at room temperature.

* * * * *